Jan. 18, 1966   G. W. HILTON   3,229,731
END AND DOWEL SIZER
Filed Dec. 18, 1963
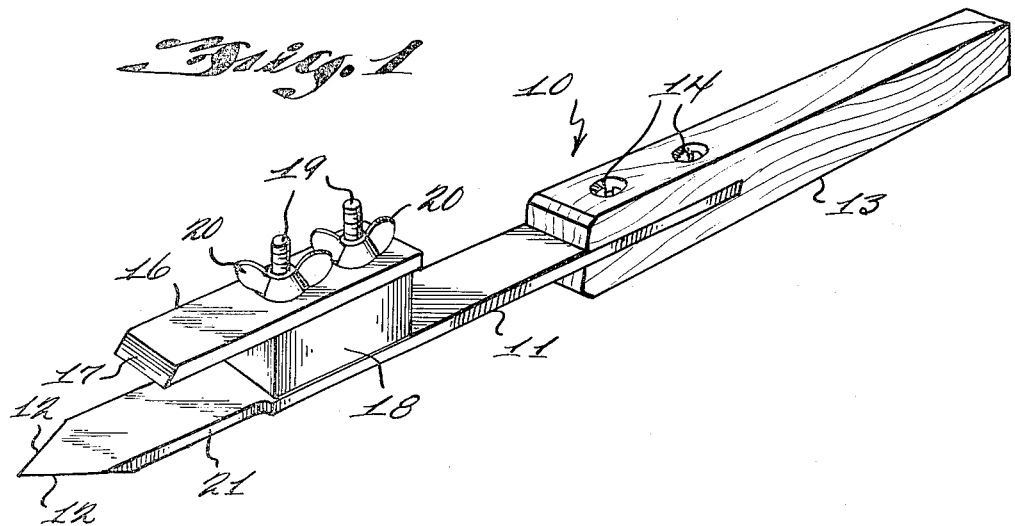
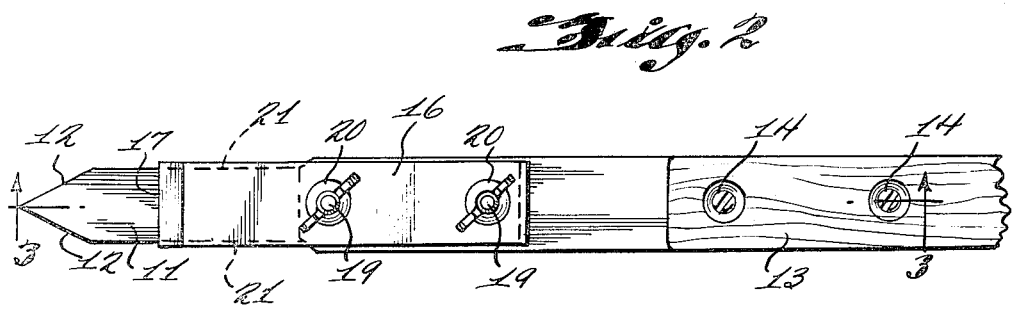
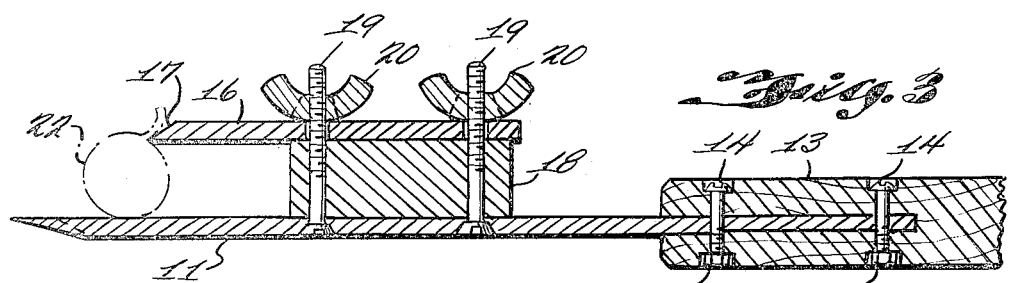
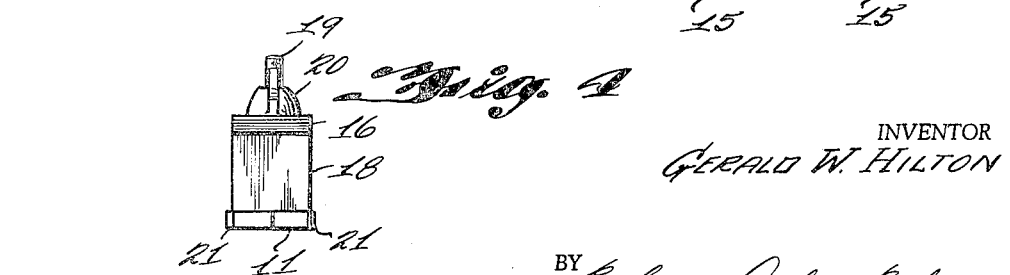
INVENTOR
GERALD W. HILTON
BY
Cushman, Darby & Cushman
ATTORNEYS United States Patent Office 3,229,731
Patented Jan. 18, 1966

3,229,731
END AND DOWEL SIZER
Gerald W. Hilton, 1267 Ostrander Lane,
Cottage Grove, Oreg.
Filed Dec. 18, 1963, Ser. No. 331,525
2 Claims. (Cl. 142—56)

This invention relates to an improved dowel sizer for use in cutting wooden dowel pins of circular cross-section.

In small commercial and home wood-working shops there is a need for a tool to form dowel pins by relatively unskilled persons in wood lathe work. For instance, in repairing furniture and various other wooden articles it has often been found that the dowel holes of the article have become enlarged through wear to an extent where it is difficult to find a standard dowel pin that will fit. Further, in constructing articles of wood or other easily workable material, an original design may require an odd size dowel pin that cannot be readily obtained on the open market. Therefore, one of the primary objects of this invention is to provide a simple inexpensive tool for producing dowel pins of various size that will fulfill the above-mentioned needs.

The object of the invention is to provide a tool for cutting wooden dowel pins that may be readily and quickly adjusted to cut different sized dowels, and also having means whereby it may be positively locked in such adjusted positions.

Another object of the invention is to provide a dowel sizer having a blade that can be used both as a roughening tool and a guide making it possible to begin with a square piece in the lathe and form a dowel of a given size without changing tools.

Still another object of the invention is to provide an improved dowel sizer in which the upper blade will not chatter.

Another object of the invention is to provide a dowel sizer which will cut from either end of the piece without taking the work out of the lathe.

Still a further object of the invention is to provide an improved dowel sizer which is capable of forming square shoulders on the material regardless of whether or not it is used as a left or right-handed tool.

In the accompanying drawings forming a part of this specification,

FIGURE 1 is a perspective view of my improved dowel sizer;

FIGURE 2 is a top view of the same;

FIGURE 3 is a cross-sectional view on line 3—3 of FIGURE 2; and

FIGURE 4 is a front end view of the tool.

Now, having more particular reference to the drawings, an illustrative embodiment of the dowel sizer is indicated generally at 10 and comprises a lower blade 11, the forward end of which is provided with cutting edges 12 and the rearward end provided with a handle 13 secured thereto by bolts 14 and nuts 15. The cutting edges 12 of the lower blade lie in the plane of the upper face of the blade and converge to meet at a point located on the center line of the blade. An upper blade 16 having a cutting edge 17 is rearwardly disposed from the front cutting edges 12 of the lower blade 11 and is vertically spaced therefrom by a gauge block 18. The cutting edge 17 is arranged at right angles to the side edges of the blade and the edge 17 lies in the plane of the lower face of the blade 16.

The gauge block 18 comprises an elongated body of metal or similar material that will vary in thickness. These gauges can comprise a set of blocks of different thicknesses that can be used alone or in conjunction with each other or with shims to vary the size of the opening between plates 11 and 16, depending upon the size of the dowel to be turned on the lathe. For purposes of illustration, a single block 18 is shown in the drawing.

The gauge block 18 and upper blade 16 are mounted on the lower blade 11 and held in place by threaded bolts 19 provided with wing nuts 20. The threaded bolts 19 pass through holes (not shown) in the blades 11 and 16 and block 18. It should be noted that the gauge block 18 is of a relatively long length with respect to the length of the upper blade 16 thus providing a large bearing area for the upper blade when in the mounted position to prevent chatter of the blade during use which will prevent chipping of the work material as well as prevent a roughened surface thereon. In the preferred embodiment, the length of the gauging block is at least one half the length of the upper blade.

The lower blade 11 is of a narrower width than the upper blade 16 in the working area defined between the tip of the cutting edges of the lower blade and the front face of the gauging block 18. This is accomplished by symmetrically removing material from each side of the lower blade as shown at 21.

In using this novel dowel sizer a noncircular piece of wood to be turned is mounted between the chuck and tail stock of an ordinary lathe and rotated thereby. A gauge block 18 (or gauge blocks) of correct size corresponding to the desired diameter of the dowel to be formed is clamped between the upper and lower blades by means of threaded bolts 19 and wing nuts 20. The cutting edges of the lower blade 11 are first used as a roughening tool or chisel to round off the square corners of the workpiece 22 by resting the lower face of blade 11 on the usual tool rest of the lathe (not shown) and manually manipulating the tool until the square corners have been rounded off. The tool is then used to form the dowel by maintaining the lower blade 11 in contact with the underside of the piece 22 as shown in FIGURE 3, and manually pressing it forward until the upper blade 16 contacts the workpiece 22 and reduces the size of the piece until it will pass under the upper blade 16 and strike against the gauge block 18. The edge 17 of the upper blade 16 being square permits the tool to be used to form square corners, such as chair rungs, chair legs or ladder rungs, or similar articles requiring a smooth square shoulder. Since the blade 11 in the working area is narrower than the upper blade 16, this permits the dowel sizer 10 to be moved longitudinally of the work piece 22 such that the cutting edges of the upper blade 16 will remove material while the lower blade 11 rests against the finished work acting as a guide thereby preventing the tool from tilting during the cutting operation. Also, the difference in width permits the tool to be used as either a right-hand or left-hand tool. Accordingly, it does not require a skilled person to produce dowels of uniform size.

It will thus been seen that there has been provided by this invention a method and apparatus in which the various objects hereinbefore set forth, together with many practical advantages, are successfully achieved. As various possible embodiments may be made of the novel features of the above invention, all without departing from the scope thereof, it is to be understood that all matter hereinbefore set forth is to be interpreted as illustrative, and not in a limiting sense.

I claim:
1. A dowel sizer comprising a first blade having a handle at one end and cutting edges at the other end, a second blade mounted on said first blade having a cutting edge rearwardly disposed of said first mentioned cutting edges, gauging means positioned between said blades for vertically spacing the same to produce a dowel of a given size, a working area defined between the tip of the cutting edges of said first blade and the front face of said gauging means, said first blade in the working area being of a narrower width than said second blade and centrally located therebeneath to permit the cutting edge of said second blade to remove material from the workpiece when the dowel sizer is moved longitudinally therealong in either direction.

2. A dowel sizer comprising a first blade having a handle at one end and cutting edges at the other end, said cutting edges lying in the plane of the upper face of said first blade and converging to meet in a point located at the center line of said blade, a second blade mounted on said first blade having a cutting edge rearwardly disposed of said first mentioned cutting edges, said cutting edge of the second blade arranged at right angles to the side edges of said second blade, gauging means positioned between said blades for vertically spacing the same to produce a dowel of a given size, said gauging means comprising a plurality of blocks positioned rearwardly of the cutting edge of the second blade for a distance sufficient to permit the dowel to pass between the blades beyond the cutting edge of said second blade, said blocks being of a length greater than one-half the length of the second blade, means for clamping said blocks and blades in assembled relationship, a working area defined between the tip of the cutting edges of said first blade and the front face of said gauging means, said first blade in the working area being of a narrower width than said second blade and centrally located therebeneath to permit the cutting edge of said second blade to remove material from the workpiece when the dowel sizer is moved longitudinally along in either direction.

References Cited by the Examiner
UNITED STATES PATENTS

| 2,362,711 | 11/1944 | Moore | 142—56 |
| 3,014,509 | 12/1961 | Cederblad | 142—56 |
| 3,188,509 | 6/1965 | Pryor | 269—101 |

FOREIGN PATENTS

| 581,010 | 9/1924 | France. |

WILLIAM W. DYER, Jr., *Primary Examiner.*

W. D. BRAY, *Examiner.*